No. 891,446.  
PATENTED JUNE 23, 1908.  
S. B. SEVERSON.  
ATTACHMENT FOR HAY RAKES.  
APPLICATION FILED MAY 13, 1907.

UNITED STATES PATENT OFFICE.

SEVERT B. SEVERSON, OF CAMBRIDGE, IOWA.

ATTACHMENT FOR HAY-RAKES.

No. 891,446.  Specification of Letters Patent.  Patented June 23, 1908.

Application filed May 13, 1907. Serial No. 373,368.

*To all whom it may concern:*

Be it known that I, SEVERT B. SEVERSON, a citizen of the United States, residing at Cambridge, in the county of Story and State of Iowa, have invented a certain new and useful Attachment for Hay-Rakes, of which the following is a specification.

The object of my invention is to provide a device that may be used in the nature of an attachment to be applied to any ordinary hay rake of the class in which the hay gathering teeth may be elevated to discharge the load, said device being provided with a number of hay engaging arms that may be held in substantially vertical positions by means of a foot lever, and when in said position will prevent the hay that is gathered by the rake teeth from rolling, and will also enable the operator to gather a large quantity of hay so that the hay rake may be used in moving hay to a hay stacker or the like, and when the operator releases the pressure upon the foot lever, the said arms will be moved rearwardly and upwardly with the hay, so that the load may be discharged in the ordinary manner.

My invention consists in the construction, arrangement, and combination of the various parts of the device, whereby the objects contemplated are attained, as hereinafter more fully set forth, pointed out in my claims, and illustrated in the accompanying drawings, in which—

Figure 1:
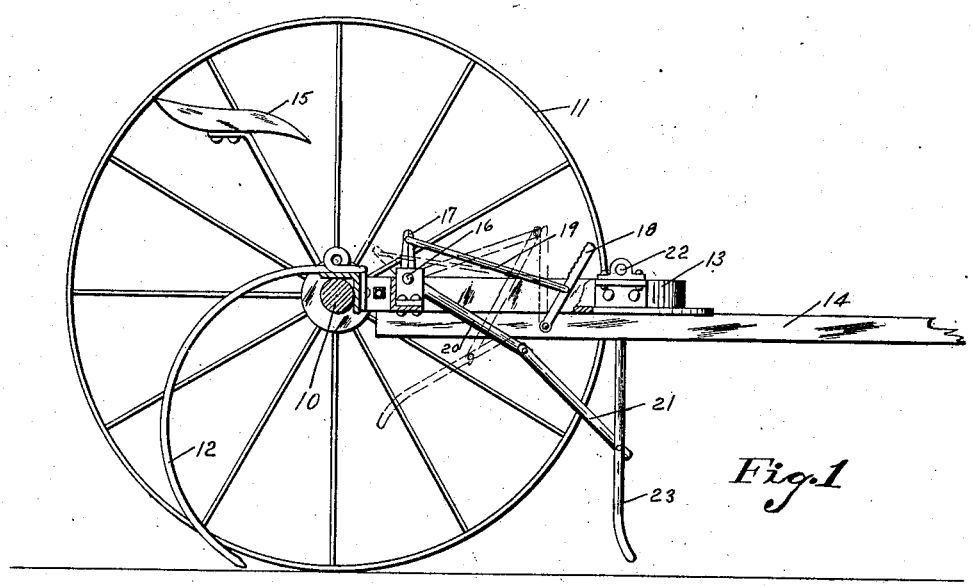
Figure 2:
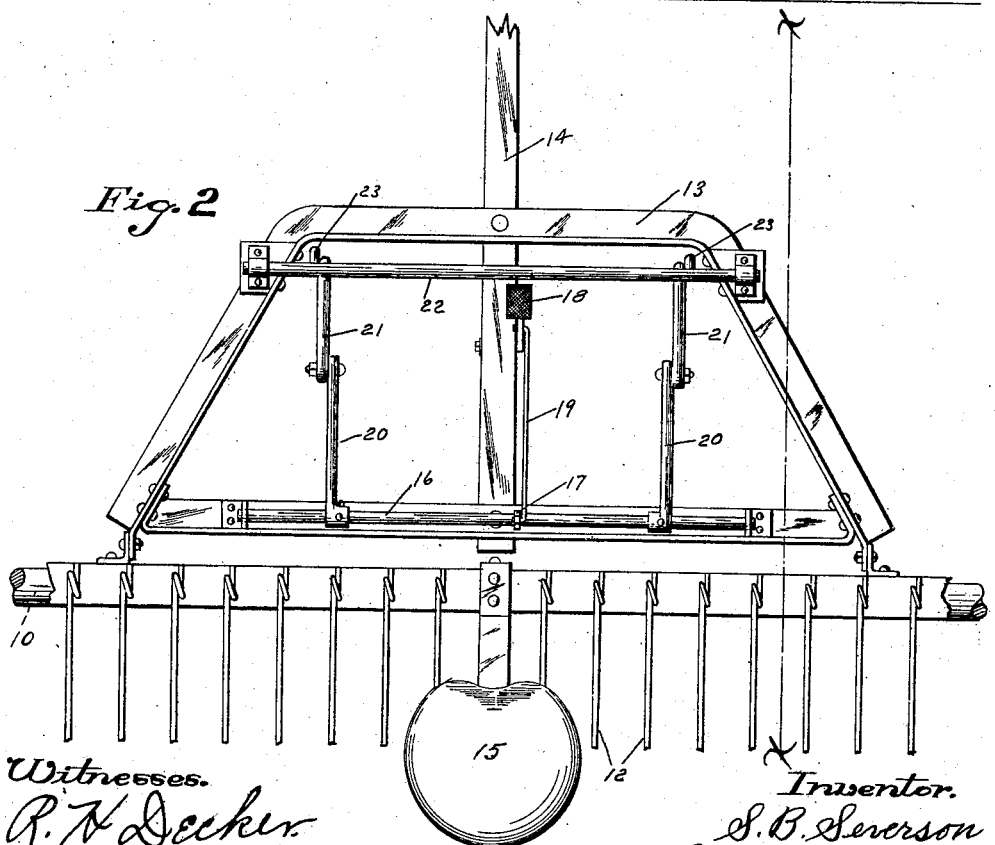

Figure 1 shows a sectional view on the line x—x of Fig. 2, illustrating a hay rake having my invention applied thereto. The dotted lines show the hay engaging arms in the position in which they are placed, when in active use. Fig. 2 shows a top or plan view of a hay rake having my improvement applied thereto.

Referring to the accompanying drawings, I have used the reference numeral 10 to indicate the rake axle, on which the supporting wheels 11 are mounted. The rake teeth are indicated by the numeral 12, and are of the ordinary construction. Extending in front of the axle is the vehicle frame 13, to which a tongue 14 is attached, and mounted upon the rear of the frame is the operator's seat 15. All of the parts just described are of the ordinary construction, and form no part of my present invention.

Mounted upon the frame 13 in front of the axle 10, is a rock shaft 16, having fixed thereto an upwardly projecting arm 17. In front of the rock shaft 16 is a foot lever 18, connected with the arm 17 by means of a link 19. Fixed to opposite portions of the rock shaft 16, are the arms 20, which extend forwardly and downwardly, and which have pivoted to their forward ends, the arms 21. When the arm 17 is in an upright position, as shown in Fig. 1, then the arms 20 extend forwardly and downwardly, as shown by solid lines in Fig. 1. And when the rock shaft is operated by the foot lever 18, then the arms 20 extend upwardly, as shown by dotted lines in Fig. 1.

Mounted near the forward end of the frame 13, is a rock shaft 22, to which I have fixed two hay engaging arms 23, which normally extend straight downwardly, and have their forward ends curved forwardly. The arms 21 are pivotally connected with the hay engaging arms 23, near their central portions.

In practical use, the arms 23 normally stand in an approximately upright position, and if the operator's foot is removed from the lever 18, they will swing rearwardly when engaged by a quantity of hay, while the rake is moving over a field, and they will not in any way interfere with the proper operation of the hay rake. If however, it is desired to move a large quantity of hay over a greater distance than a hay rake will ordinarily carry it, then the operator places his foot upon the lever 18 with sufficient force to hold the arms 23 in a substantially vertical position as shown by solid lines in Fig. 1. When in this position, the arms will prevent the hay in front of the rake teeth from rolling, and will enable the operator to carry a large quantity of hay to a point of discharge, such for instance as a hay stacker. When it is desired to dump the hay, the operator removes his foot from the lever 18, and then when the rake is further advanced the arms 23 will swing rearwardly, as shown by dotted lines in Fig. 1, whereupon the operator may dump the hay by elevating the rake teeth in the ordinary way.

Having thus described my invention, what I claim and desire to secure by Letters Patent of the United States, therefor, is—

1. The combination with a hay rake of a number of hay engaging arms hinged to the hay rake frame in front of the rake teeth, a foot lever, and means for connecting the foot lever with said hay engaging arms, said means so arranged that a pressure upon the foot lever will tend to swing the hay engaging arms forwardly, and when said pressure is removed said hay engaging arms will be free to swing rearwardly and upwardly.

2. The combination with a hay rake of a rock shaft mounted on the hay rake frame slightly in advance of the rake teeth, two jointed arms fixed to the rock shaft and extended downwardly and forwardly, two hay engaging arms pivoted to the rake frame in front of said rock shaft, and normally extended straight downwardly and having the forward ends of the jointed arms pivoted thereto, a foot lever pivoted to the frame, an arm connected with the rock shaft and a link connecting said arm with the foot lever, said parts being so arranged that the operator may by pressing upon the foot lever hold the hay engaging arms in a substantially vertical position, and when said pressure is removed the hay engaging arms will be free to swing rearwardly by the pressure on the hay when the rake is being advanced.

Des Moines, Iowa, April 27, 1907.

SEVERT B. SEVERSON.

Witnesses:
   S. F. CHRISTY,
   A. G. HAGUE.